United States Patent
Brennan (10) Patent No.: US 7,123,874 B1
(45) Date of Patent: Oct. 17, 2006

(54) CELLULAR PHONE BLOCKER

(76) Inventor: Joseph P Brennan, 12 Scarlet Oak Dr., Doylestown, PA (US) 18901

( * ) Notice: Subject to any disclaimer, the term of this patent is extended or adjusted under 35 U.S.C. 154(b) by 482 days.

(21) Appl. No.: 10/014,034

(22) Filed: Dec. 10, 2001

(51) Int. Cl.
*H04K 3/00* (2006.01)

(52) U.S. Cl. .................. 455/1; 455/414.1; 455/63.1; 340/5.2

(58) Field of Classification Search ............. 455/1, 455/99, 95, 152.1, 238.1, 297, 345; 340/438, 340/447, 456, 459, 539.1; 307/9.1–10.8; 380/252–254; 342/14
See application file for complete search history.

(56) References Cited

U.S. PATENT DOCUMENTS

| | | | |
|---|---|---|---|
| 4,644,299 | A | 2/1987 | Amoroso et al. |
| 5,001,771 | A | 3/1991 | New |
| 5,113,438 | A | 5/1992 | Blokker, Jr. et al. |
| 5,220,680 | A | 6/1993 | Lee |
| 5,321,405 | A | 6/1994 | Luck |
| 5,809,398 | A | 9/1998 | Moberg et al. |
| 5,850,596 | A | 12/1998 | Reynolds |
| 6,002,934 | A | 12/1999 | Boyer et al. |
| 6,052,577 | A | 4/2000 | Taguchi |
| 6,195,529 | B1 | 2/2001 | Linz et al. |
| 6,222,458 | B1 * | 4/2001 | Harris ............ 340/686.6 |
| 6,429,768 | B1 * | 8/2002 | Flick ............... 340/5.2 |
| 6,687,497 | B1 * | 2/2004 | Parvulescu et al. ... 455/420 |
| 6,771,946 | B1 * | 8/2004 | Oyaski ............. 455/345 |
| 2002/0102968 | A1 * | 8/2002 | Arend et al. ........ 455/414 |
| 2004/0077339 | A1 * | 4/2004 | Martens ........... 455/414.1 |

FOREIGN PATENT DOCUMENTS

| EP | 1089446 A1 | 4/2001 |
|---|---|---|
| WO | WO01/03352 A1 | 1/2001 |

OTHER PUBLICATIONS http://www.cell-block-r-com.
http://www.cavadino.com.
http://ish-web.com.

* cited by examiner

*Primary Examiner*—Gerald Gauthier
(74) *Attorney, Agent, or Firm*—Ryder IP Law, P.C.; Douglas J. Ryder (57) ABSTRACT the invention shows a jamming device having a transmitting system that outputs a signal frequency modulated that inhibits a low power receiving antenna from receiving a fixed frequency such as a cellular telephone.

The jamming device can function as a stand alone device or be incorporated into existing electrical systems whereby energizing said electrical system will cause said jammer to inhibit the use of low power radio transmission/reception devices such as cellular phones.

1 Claim, 8 Drawing Sheets

FIG 1

(PRIOR ART)

CELLULAR PHONE BLOCKER

BACKGROUND OF THE INVENTION

1. Field of the Invention

The present invention relates generally to jamming devices and, more specifically, to a jamming device having a transmitting system that outputs a signal frequency modulated that inhibits a low power receiving antenna from receiving a fixed frequency such as a cellular telephone.

The jamming device of the present invention while functioning as a stand alone device, in the preferred embodiment can be incorporated into existing electrical systems whereby energizing said electrical system will cause said jammer to inhibit the use of low power radio transmission/reception devices such as cellular phones.

Additionally, there can exist one or more sensors incorporated into the jammer triggering circuit that can trigger the jamming device.

2. Description of the Prior Art

There are other jamming device designed for inhibiting the use of low power transmission/reception devices. Typical of these is U.S. Pat. No. 4,644,299 issued to Amoroso et al. on Feb. 17, 1987.

Another patent was issued to New on Mar. 19, 1991 as U.S. Pat. No. 5,001,771. Yet another U.S. Pat. No. 5,113,438 was issued to Blokker, Jr. et al. on May 12, 1992 and still yet another was issued on Jun. 15, 1993 to Lee as U.S. Pat. No. 5,220,680.

Another patent was issued to Luck on Jun. 14, 1994 as U.S. Pat. No. 5,321,405. Yet another U.S. Pat. No. 5,809,398 was issued to Moberg et al. on Sep. 15, 1998. Another was issued to Reynolds on Dec. 15, 1998 as U.S. Pat. No. 5,850,596 and still yet another was issued on Dec. 14, 1999 to Boyer et al. as U.S. Pat. No. 6,002,934.

Another patent was issued to Taguchi on Apr. 18, 2000 as U.S. Pat. No. 6,052,577. Yet another U.S. Pat. No. 6,195,529 was issued to Linz et al. on Feb. 27, 2001. Another was issued to Katsura on Apr. 4, 2001 as E.P. Patent No. 1 089 446 and still yet another was issued on Jan. 11, 2001 to Gim as WIPO Patent No. WO 01/03352

U.S. Pat. No. 4,644,299

Inventor: Frank Amoroso et al.

Issued: Feb. 17, 1987

A pseudorandom noise generator which operates in different modes is disclosed. The pseudorandom noise generator (10) includes circuitry (11,13) for providing a digital signal having a pseudorandom sequence at a selected clock rate; a modulation control circuit (15, 17, 20, 23) for selectively providing a modulation control signal that corresponds to either a non-filtered or filtered version of the digital signal, and for controlling the mode of operation of the noise generator; a modulation circuit (27, 29, 31, 33) responsive to the modulation control signal for providing a modulation signal; and a voltage controlled oscillator (VCO) (35) responsive to the modulation signal for providing a VCO output having a relatively constant output spectrum and high spectral containment for each mode of operation pursuant to control by the modulation control circuit and the modulation circuit.

U.S. Pat. No. 5,001,771

Inventor: Anthony M. New

Issued: Mar. 19, 1991

A jammer includes means for receiving a local radio transmission and means for determining the frequency of the local radio transmission. Monitoring circuits are arranged to detect the end of the local radio transmission and only then to trigger the transmission of a jamming signal by jamming signal transmitting means. In this manner the jammer jams local reception of the response of a non-local station to the detected local transmission. The jammer is able to jam effectively using a low power signal. The reduction in the power-consumption of the jammer makes it particularly suitable for use as a leave-behind jammer for military applications.

U.S. Pat. No. 5,113,438

Inventor: Johan F. Blokker, Jr.

Issued: May 12, 1992

A jammer for an infrared remote control temporarily disables the remote control by transmitting an infrared pulse pattern similar to the pulse pattern of the remote control at approximately the same frequency but at a different pulse pattern, thereby confusing the detection circuitry of the receiving device, such as a television remote control receiver. The circuitry of the jammer preferably includes a timer for reducing battery power consumption by triggering a second timer on the transmitter to emit pulses only periodically U.S. Pat. No. 5,220,680

Inventor: William C. Y. Lee

Issued: Jun. 15, 1993

This invention is a multiple-frequency signal generator apparatus and method primarily for simulating a cell site interference environment for electromagnetic communications systems. The generator can produce a plurality of frequencies having a frequency-spacing of d cycles per second. The invention comprises a single frequency multiplier, at least three oscillators and two mixers for providing a multitude of frequencies closely spaced about a carrier frequency. The simple design and components avoid complexity and save costs.

U.S. Pat. No. 5,321,405

Inventor: Arthur J. Luck

Issued: Jun. 14, 1994

A transmitter/receiver system is provided wherein a transmitter of such system produces a transmitted signal frequency modulated in accordance with the level of a modulating signal and a receiving antenna has an output thereof coupled to a receiver through a switch means, for coupling or inhibiting signals received by the receiving antenna from passing to the receiver selectively in accordance with the level of the modulating signal.

U.S. Pat. No. 5,809,398

Inventor: Tommy Moberg

Issued: Sep. 15, 1998

An improved repeater for receiving and re-transmitting radio signals for a cell in a cellular telecommunication system. The repeater raises the levels and is capable of converting the frequencies of the radio signals used in the telecommunication system. Due to the power amplifiers being provided between the channel selecting means and combiner, the power amplifier needs only to amplify one frequency band. In this way the repeater gets a simpler design, demands less maintenance, and gets a higher degree of efficiency in combination of high power capacity and generation of low levels only of intermodulation products.

U.S. Pat. No. 5,850,596

Inventor: Kevin Reynolds

Issued: Dec. 15, 1998

A first PCS unit monitors carrier activity of other PCS units in an unlicensed frequency band adjacent to a licensed frequency band used by the first PCS unit, which has a microprocessor that compiles a history table of this other carrier activity. The first PCS unit then uses the history table to transmit on the licensed frequency band an interference signal synchronized with the predicted occurrence of the other carrier activity such that the permitted sideband signals of the interference signal in the adjacent unlicensed band causes the other PCS units to stop broadcasting on the adjacent unlicensed band. The first PCS unit then begins broadcasting on both the adjacent unlicensed band and the licensed band, a message being embedded in these broadcasts to advise intended receiving PCS units that both bands are now available for communication sessions with the first PCS unit U.S. Pat. No. 6,002,934

Inventor: Pete A. Boyer et al.

Issued: Dec. 14, 1999

A method and computerized apparatus for assigning frequencies to a plurality of cells in a cellular network. Each cell requires a predetermined number of frequencies. The method includes generating a difficulty factor for each cell, wherein each cell's difficulty factor is based on an adjustment factor for that cell, and wherein, following a first unsuccessful assignment attempt, each cell's adjustment factor is indicative of a relative level of difficulty in selecting frequencies for that cell during the first unsuccessful assignment attempt. The method further includes the steps of selecting a cell from the plurality of cells based on each cell's difficulty factor; selecting a frequency from the available frequencies for the selected cell; when at least one of the plurality of cells requires at least one more frequency and there is at least one frequency available for use by that cell, repeating the steps of generating a difficulty factor, selecting a cell and selecting a frequency; and when at least one of the plurality of cells requires at least one more frequency and there are no frequencies available for use by that cell, updating each cell's adjustment factor, unselecting all of the selected cells and all of the selected frequencies for the selected cells, and re-performing the steps of generating a difficulty factor, selecting a cell, selecting a frequency, as a second assignment attempt.

U.S. Pat. No. 6,052,577

Inventor: Masayuki Taguchi

Issued: Apr. 18, 2000

A mobile station use limiting system includes a base station provided in a cell and connected to a public telephone network, a use limiting station provided in the cell, for transmitting a use limitation signal. A mobile station can perform communication with the base station via an electromagnetic wave. The communication with the base station is limited in the mobile station in response to the use limitation signal.

U.S. Pat. No. 6,195,529

Inventor: Joachim Linz

Issued: Feb. 27, 2001

The invention relates to a transmission blocker for mobile telephones as well a method for preventing transmission activities of mobile telephones in the vicinity of safety-relevant electronic devices, comprising a device for transmitting radio signals as interference signals in the frequency range of the relevant mobile radio network in such fashion that synchronization of the mobile telephone with a radio station and/or decoding of the information in the signaling channel and/or recognition of the relevant signals from the mobile radio network can be prevented.

E. P. Patent Number 1 089 446

Inventor: Takatoshi Katsura

Issued: Apr. 4, 2001

This European Patent discloses a wireless terminal device that includes an antenna, a transmitting circuit, a direct conversion receiving circuit, a circulator and a band rejection filter. The direct conversion receiving circuit can have smaller sizes than a receiving circuit of a heterodyne type, and is required to remove fewer spurious jamming waves. Owing to them, the whole size of the wireless terminal device can be small. Further, the direct conversion receiving circuit includes even harmonic mixers and a frequency of a local oscillation wave is equal to half a frequency of the received wave so that leakage of the local oscillation wave toward the antenna and therefore deterioration in sensitivity do not occur.

W.I.P.O. Patent Number WO 01/03352

Inventor: Hi Chul Gim

Issued: Jan. 11, 2001

The subject invention discloses a jammer for jamming at low power radio transmission/reception by wireless communication units such as cellular phones so that communication over said wireless communication units are interfered. A jammer in accordance with the subject invention comprises an oscillator for generation oscillating signal having a fixed frequency; an up converter for multiplying the frequency of said oscillating signal from said oscillator to up-convert it to one or more band extending means for extending the frequency band of output signal from said up converter; one or more power amplifier for amplifying output signal from said band extending means to a jammable level; and one or more antenna connected with each of said amplifiers.

While these frequency disrupter devices may be suitable for the purposes for which they were designed, they would not be as suitable for the purposes of the present invention, as hereinafter described.

SUMMARY OF THE PRESENT INVENTION

A primary object of the present invention is to provide a jamming device to inhibit the use of low power transmission/reception devices within a designated area.

Another object of the present invention is to provide a jamming device that works in conjunction with one or more sensors that trigger the jamming device.

Yet another object of the present invention is to provide a jamming device that can be retrofitted into an electrical system so that energizing said system will cause said jamming device to generate a jamming signal.

Still yet another object of the present invention is to provide a jamming device that can be retrofitted into the electrical system of a motor vehicle.

Another object of the present invention is to provide a jamming device that can be retrofitted into the ignition system of a motor vehicle whereby when said ignition system is energized the jamming device will inhibit the use of cellular phones within said motor vehicle.

Yet another object of the present invention is to provide a jamming device that can be retrofitted into a mechanical system having one or more sensors that can trigger the jamming device.

Additional objects of the present invention will appear as the description proceeds.

The present invention overcomes the shortcomings of the prior art by providing a stand alone jamming device that transmits a modulated frequency that will inhibit the use of low power transmitting/receiving devices within a designated immediate area of said jamming device.

In addition said jamming device can be manufactured into or retrofitted into an existing electrical system whereby energizing said system will cause said jamming device to operate while said system is energized.

Furthermore, said jamming device can be manufactured into or retrofitted into existing mechanical system having one or more sensors whereby said sensor will under predetermined conditions cause said jamming device to operate.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS 10 cellular phone jammer
12 prior art usage
14 cellular phone
16 cellular phone antenna
18 modulated signal
20 cellular phone jammer antenna
22 cellular phone jammer transmitter
24 indicator light
26 power supply wire
28 ignition switch
30 power supply
32 dashboard

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention and other possible variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Figure 1:
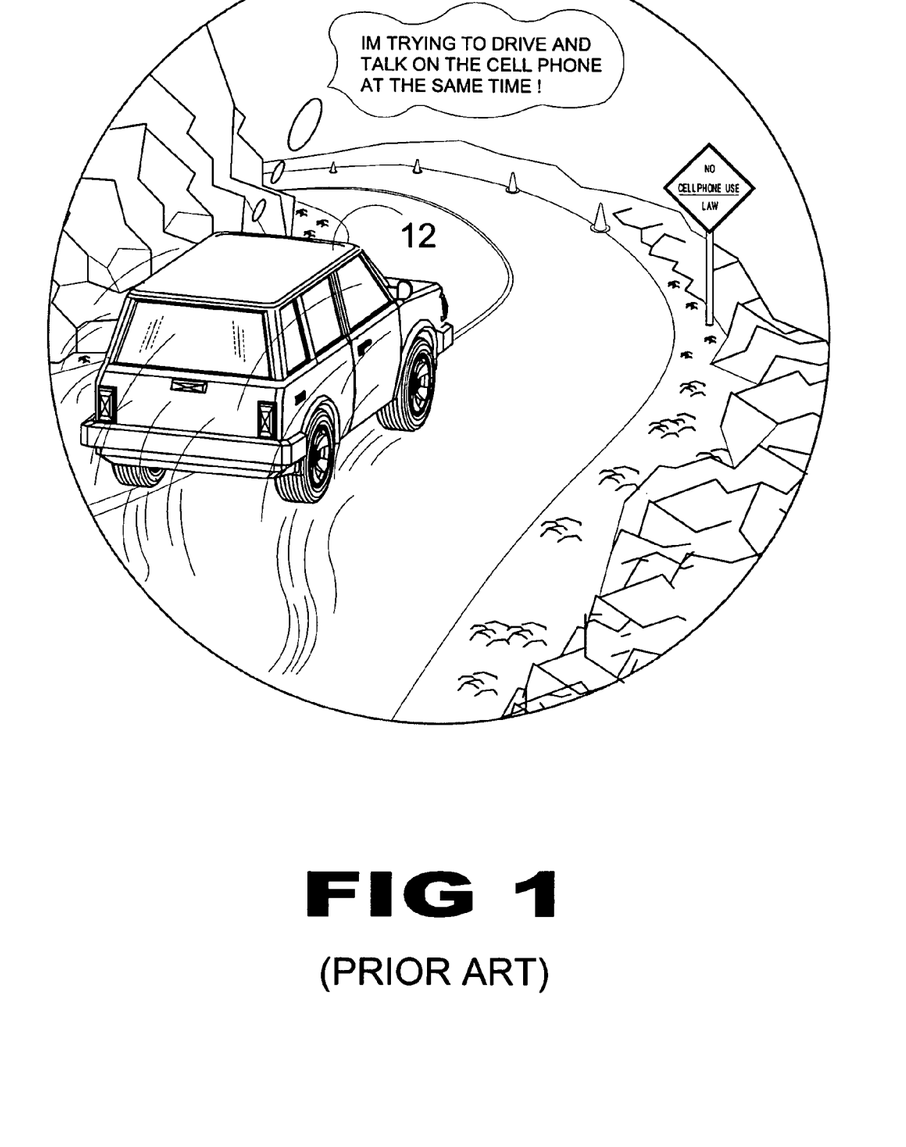
FIG. 1 is an illustrative view of prior use of the cellular phone in a moving vehicle.

FIG. 1 is an illustrative view of prior use 12 of the cellular phone in a moving vehicle. States and counties have implemented laws prohibiting the use of cell phones while operating a motor vehicle due to the recent flurry of accidents and fatalities on world wide roadways caused by cell phone use while driving. The laws are often ignored.

Figure 2:
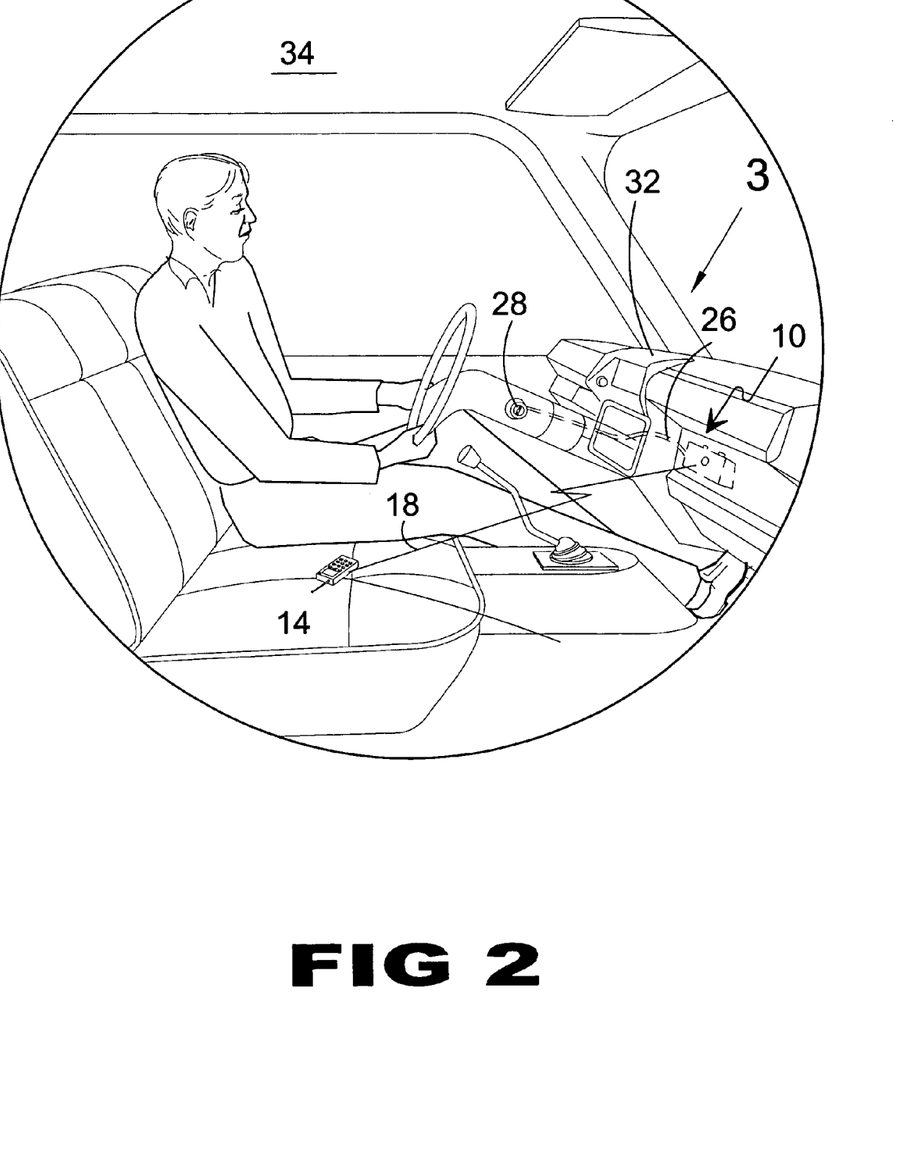
FIG. 2 is an illustrative view of the cellular phone disrupter of the present invention incorporated into a moving vehicle.

FIG. 2 is an illustrative view of the cellular phone disrupter 10 of the present invention incorporated into a moving vehicle 12. Drivers will be blocked from the use of their cell phones 14 while operating a moving vehicle when the cellular phone disrupter 10 is in use. The device disables cell phone 14 use while the vehicles engine is running by sending a signal 18 from a blocking device 10 located in the vehicles dashboard 32 to the cell phone 14 and disabling it.

Figure 3:
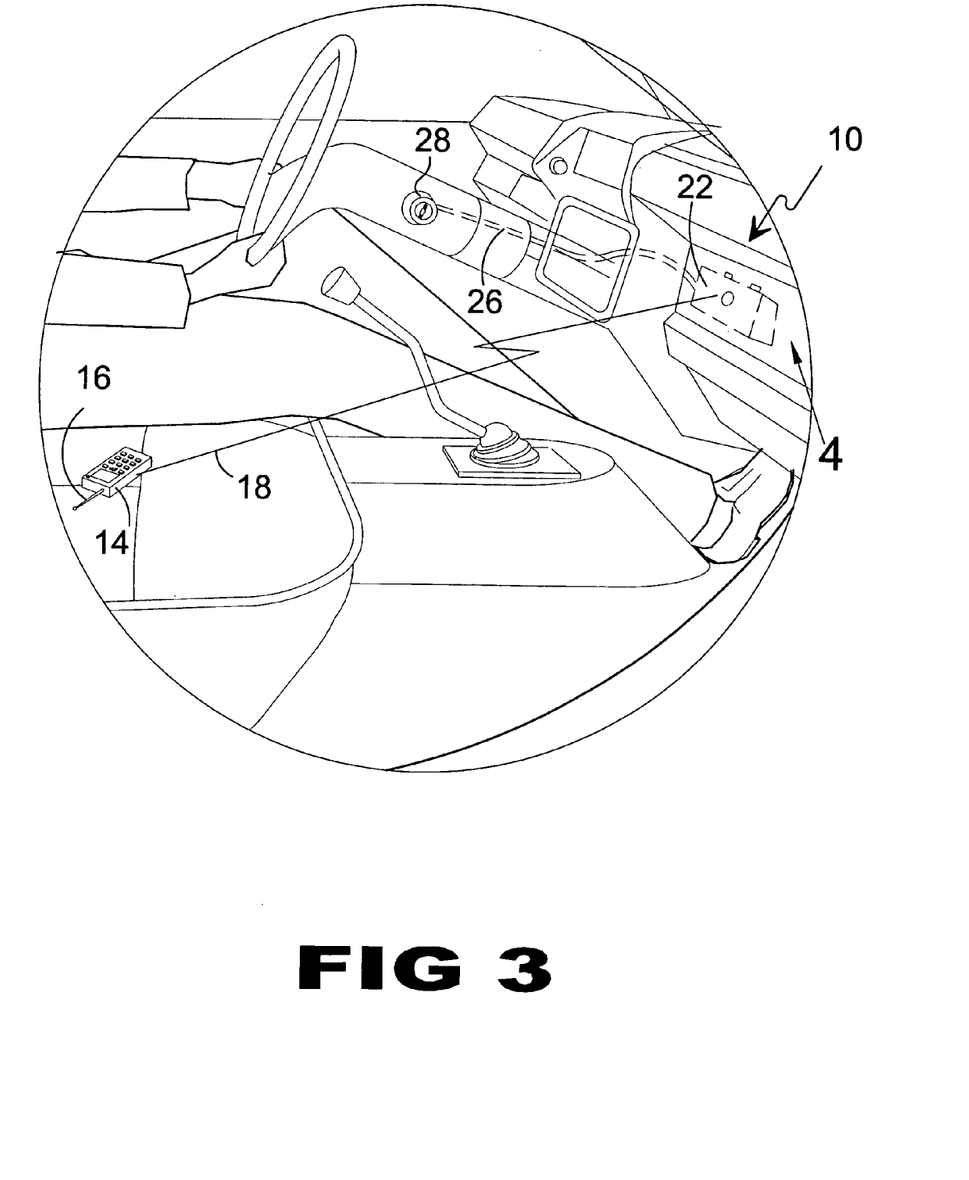
FIG. 3 is a perspective view of the present invention in use.

FIG. 3 is a perspective view of the present invention in use. Drivers will be blocked from the use of their cell phones 14 while operating a moving vehicle by the cellular phone disrupter 10. The blocking unit 10 is incorporated into the vehicle's ignition 28. The device disables cell phone 14 use while the vehicle's engine is running. Transmitting a signal 18 from the blocking device 10 located in the vehicle's dashboard 32 that inhibits the reception 16 of the cell phone 14. If the driver requires the use of the phone, they must stop the vehicle 12 and turn the engine off thereby de-energizing the blocking device 10.

Figure 4:
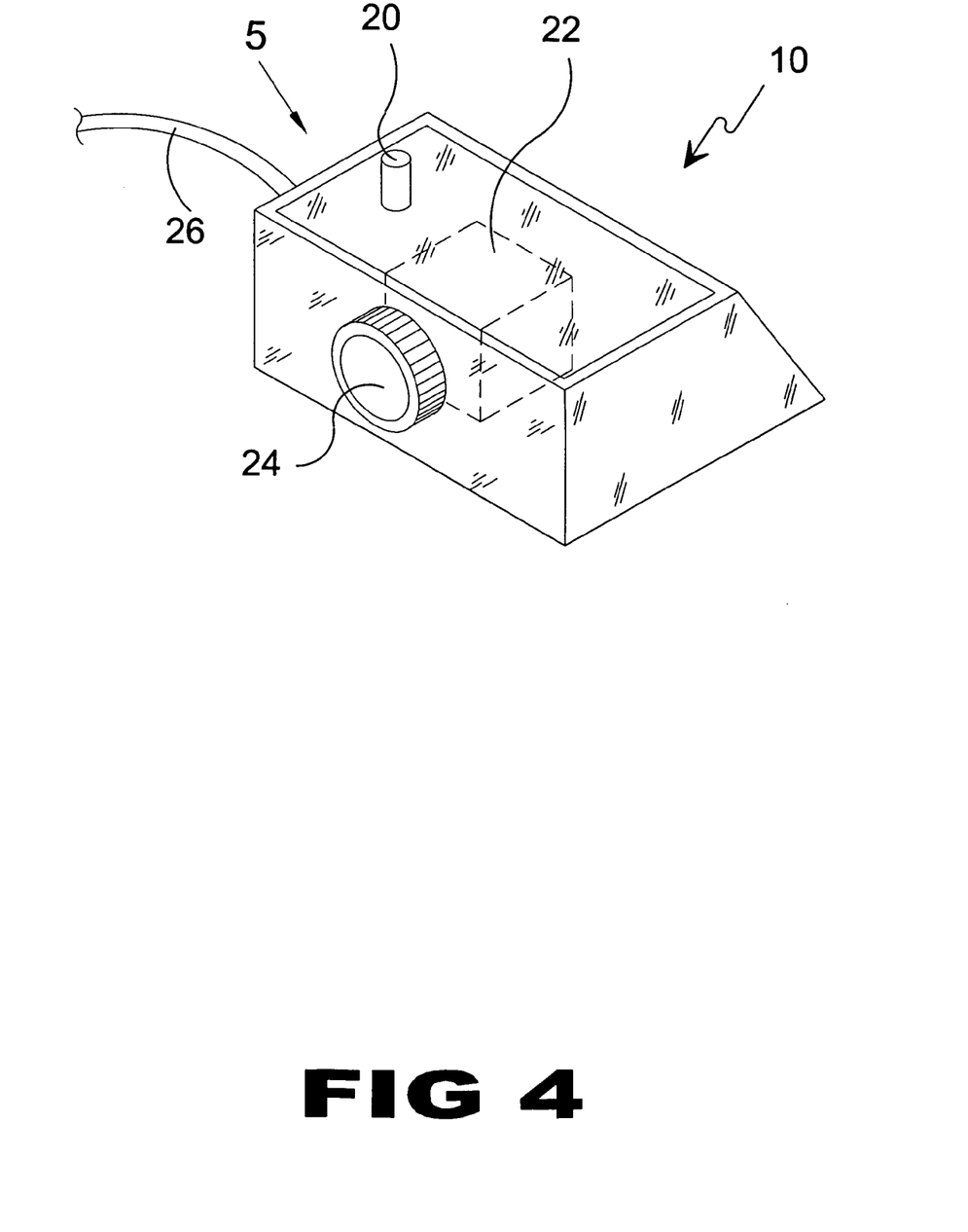
FIG. 4 is a perspective view of the cellular phone blocking unit of the present invention.

FIG. 4 is a perspective view of the cellular phone blocking unit 10 of the present invention. The blocking unit 10 of the present invention is mounted within the dashboard 32 of a vehicle 12 and is hard wired to the vehicle's ignition switch 28. When the engine is running, a signal 18 is transmitted by the blocking unit 10 that inhibits the reception 16 of the cell phone 14 thereby disabling the cell phone 14.

Figure 5:
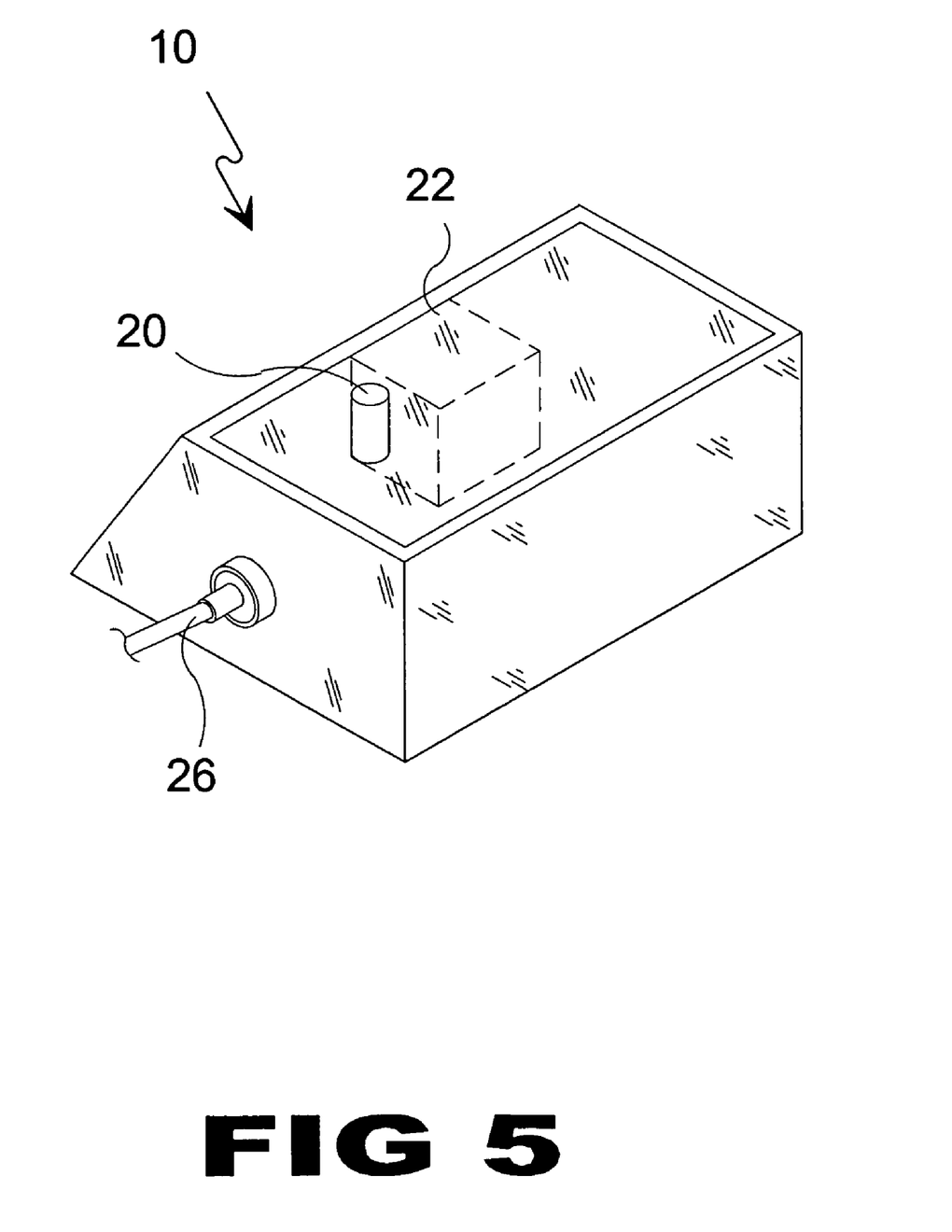
FIG. 5 is a rear perspective view of the cellular phone blocking unit of the present invention.

FIG. 5 is a rear perspective view of the cellular phone blocking unit 10 of the present invention. The blocking unit 10 of the present invention is mounted within the dashboard 32 of a vehicle 12 and is hard wired 26 to the vehicle's ignition switch 28. When the ignition system 28 is energized the blocking unit 10 transmits 22 a signal 18 that inhibits the use of low power transmitting/receiving devices 10 such as cellular telephones, while the ignition system 28 is energized. Turning off the system de-energizes the blocking unit 10.

Figure 6:
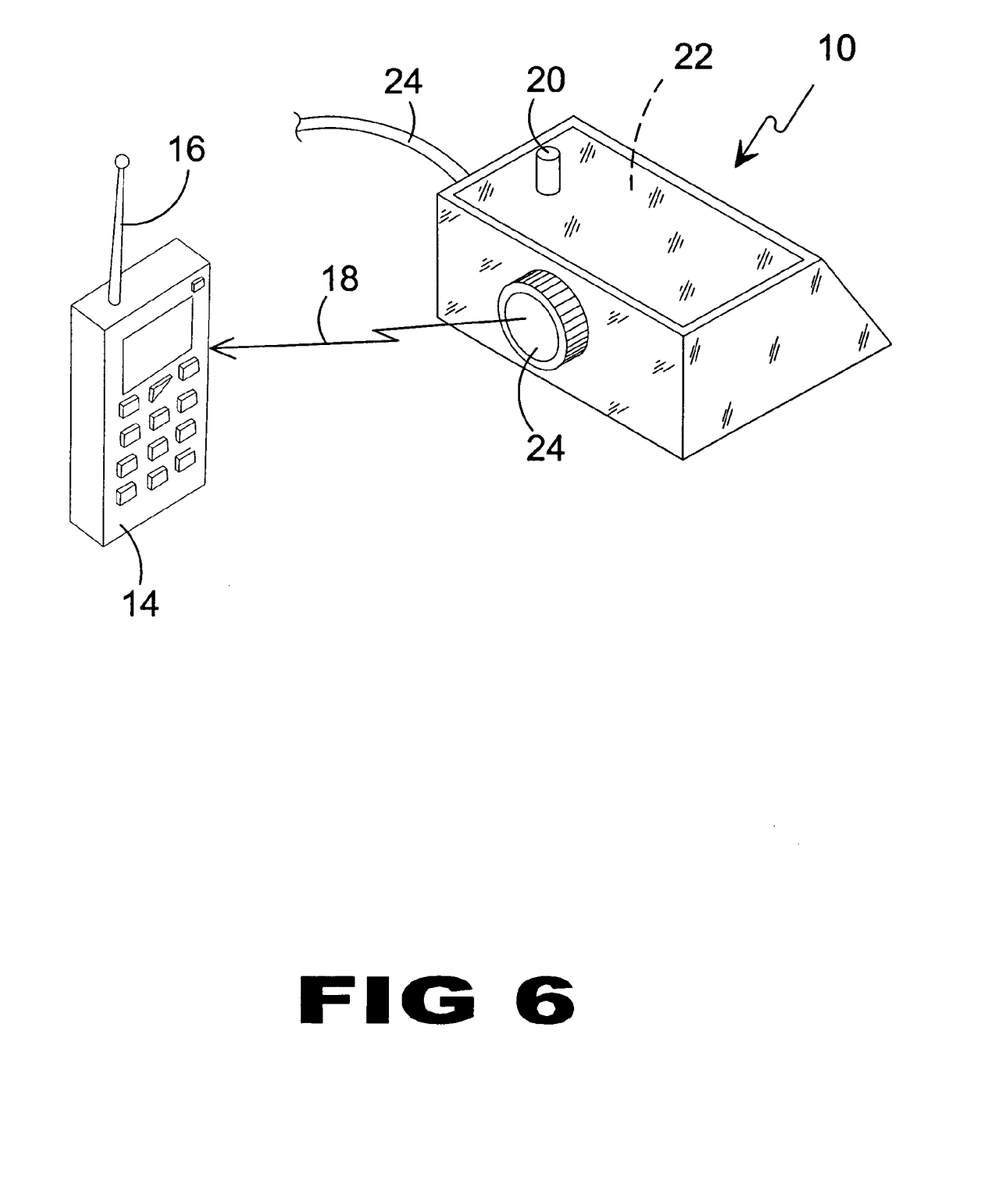
FIG. 6 is a perspective view of the cellular phone blocking unit of the present invention and a cell phone.

FIG. 6 is a perspective view of the cellular phone blocking unit 10 of the present invention and a cell phone 14. The blocking unit 10 is manufactured or retrofitted into the vehicle's ignition system 28. When the ignition system 28 is energized, so is the jamming device 10. The jamming device 10 transmits a signal 18 that is picked up by the antenna 16 of the cellular phone 14, thereby inhibiting reception by the cellular phone 14. The jamming device 10 could be incorporated into other electrical or mechanical systems that would trigger the operation of the jamming device.

Figure 7:
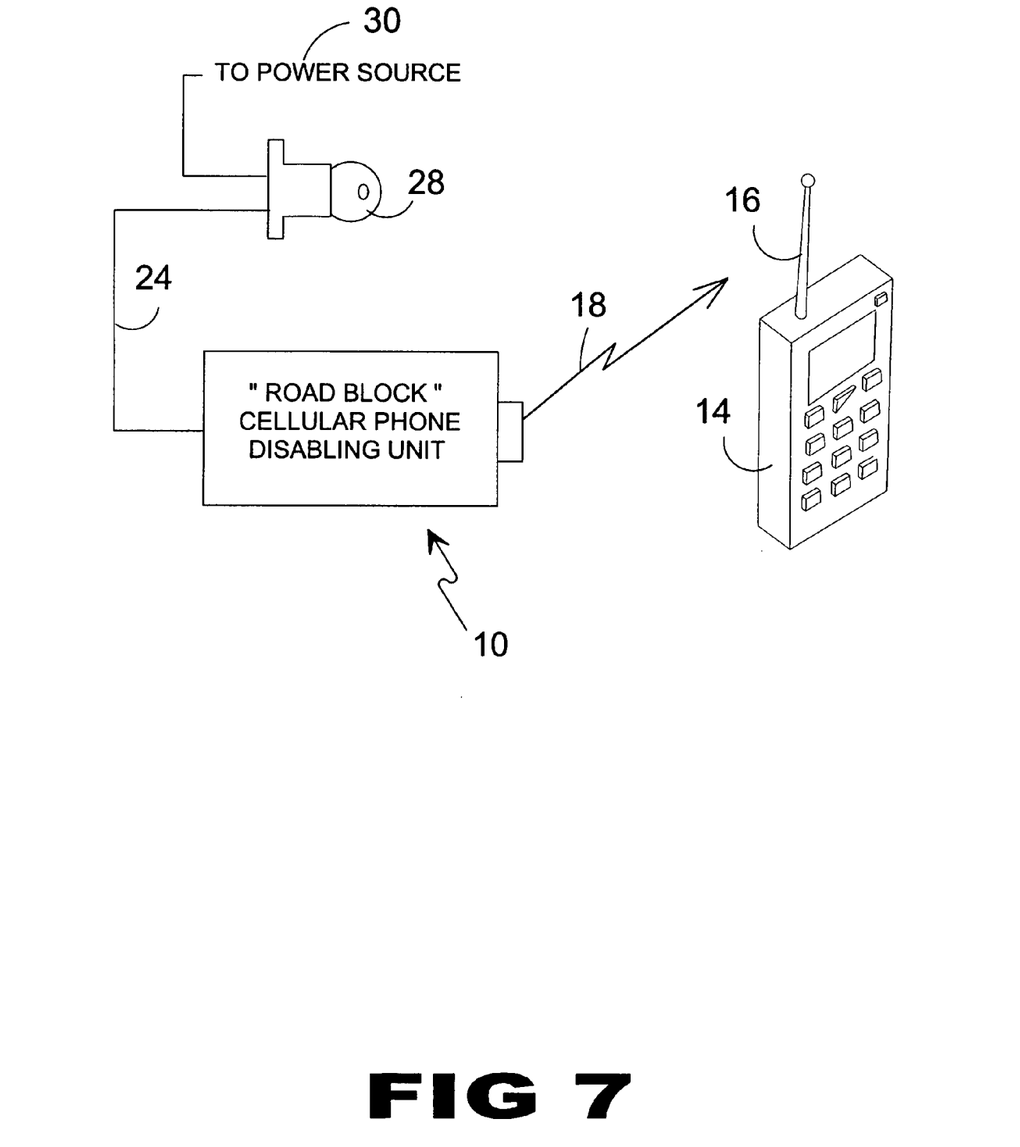
FIG. 7 is a Flow chart of the cellular phone blocking unit while the vehicle's engine is running.

FIG. 7 is a flow chart of the cellular phon blocking unit 10 while the vehicle's engine is running. The present invention will block drivers from using their cell phones 14 while operating a moving vehicle. The blocking unit 10 is hard wired 26 to the vehicle's ignition. The device disables cell phone 14 use while the vehicles engine 28 is running by sending a signal 18 from the blocking device 10 located in the vehicle's dashboard 32 that is picked up to the antenna 16 of the cell phone 14 and disabling its use. If the driver requires the use of the phone 14, they must stop the vehicle 12 and turn the engine off thereby disabling the blocking device 10.

Figure 8:
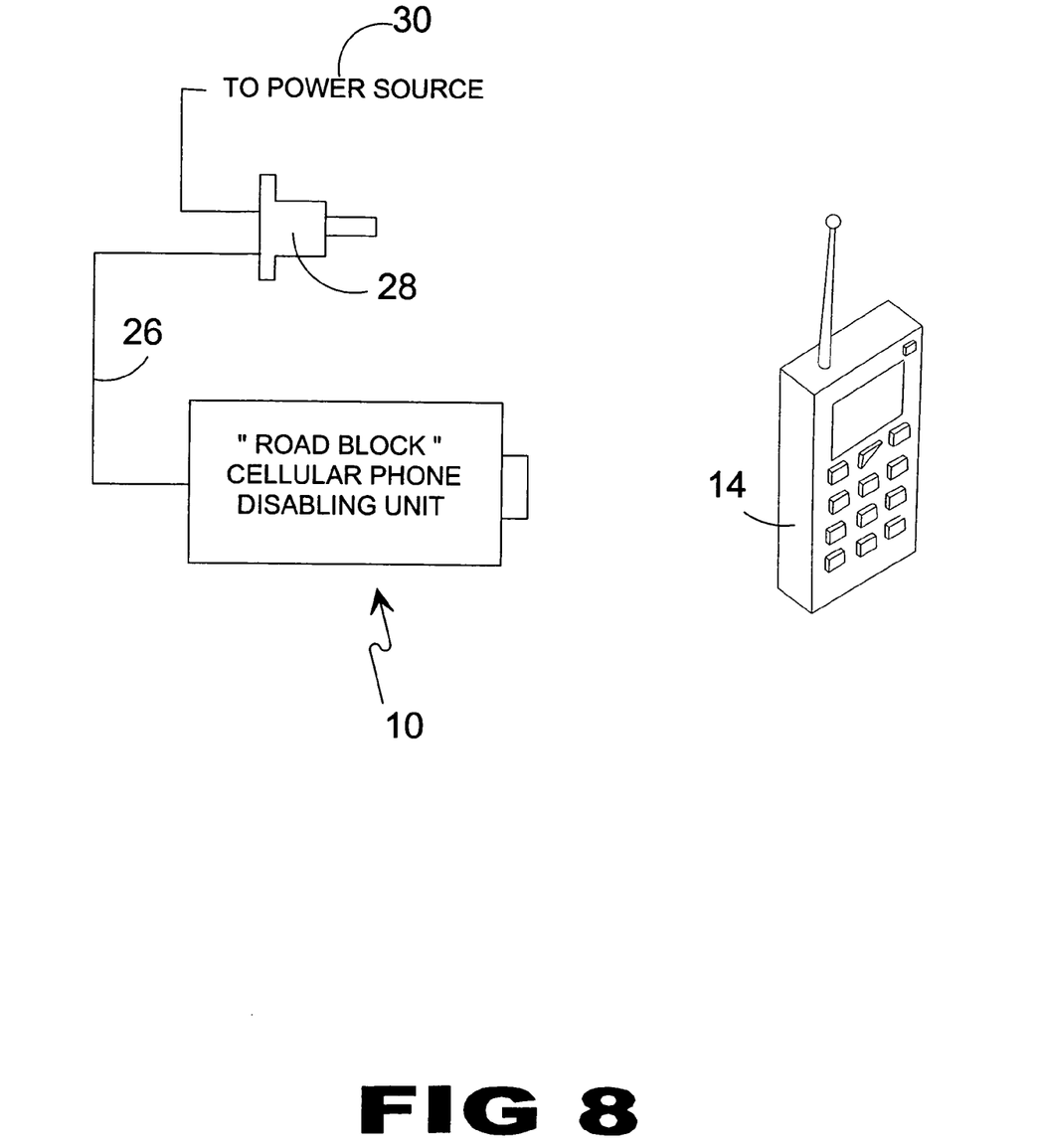
FIG. 8 is a flow chart of the cellular phone blocking unit while the vehicle's engine is off.

FIG. 8 is a flow chart of the cellular phone blocking unit 10 while the vehicle's engine is off. The cellular phone 14 will only be operable when the vehicle's ignition 28 and engine are in the off position.

What is claimed is new and desired to be protected by Letters Patent is set forth in the appended claims:

1. An electronic device generating radio frequency signals that prevents the reception of radio frequency signals used in cellular phone technology comprising:
    a) said electronic device being mounted within a dashboard of a motor vehicle;
    b) said electronic device containing a transmitter for transmitting radio frequency jamming signals to be received by a cellular phone within said vehicle to block telephone reception by said cellular phone; and
    c) said electronic device being incorporated into the vehicle's ignition by hard wiring said electronic device to an ignition switch in said motor vehicle to receive power when said ignition switch is turned on so that said electronic device issues a cellular phone jamming signal when said ignition system is energized and ceases to issue a jamming signal when said ignition switch is not energized; and
    d) said electronic device having an indicator light on a front face thereof and a cellular phone jammer antenna contained within a housing for said electronic device.

\* \* \* \* \*